March 10, 1959 K. HAGENHAUS 2,877,304

SIGNALLING SYSTEM FOR SIMULTANEOUSLY TRANSMITTING A PLURALITY OF MESSAGES

Filed Feb. 20, 1953 7 Sheets-Sheet 1

Inventor:
Kurt Hagenhaus.
By [signature] Atty.

March 10, 1959 K. HAGENHAUS 2,877,304

SIGNALLING SYSTEM FOR SIMULTANEOUSLY TRANSMITTING A PLURALITY OF MESSAGES

Filed Feb. 20, 1953 7 Sheets-Sheet 2

Inventor:
Kurt Hagenhaus.
By. [signature] Atty.

Inventor:
Kurt Hagenhaus.
By [signature] Atty.

March 10, 1959 K. HAGENHAUS 2,877,304

SIGNALLING SYSTEM FOR SIMULTANEOUSLY TRANSMITTING A PLURALITY OF MESSAGES

Filed Feb. 20, 1953 7 Sheets-Sheet 4

Inventor:
Kurt Hagenhaus.

By [signature] Atty

Inventor:
Kurt Hagenhaus.
By [signature] Atty.

March 10, 1959 K. HAGENHAUS 2,877,304

SIGNALLING SYSTEM FOR SIMULTANEOUSLY TRANSMITTING A PLURALITY OF MESSAGES

Filed Feb. 20, 1953 7 Sheets-Sheet 6

Inventor:
Kurt Hagenhaus.
By [signature] Atty.

Inventor:
Kurt Hagenhaus.
By [signature] Atty

United States Patent Office 2,877,304
Patented Mar. 10, 1959

2,877,304

SIGNALLING SYSTEM FOR SIMULTANEOUSLY TRANSMITTING A PLURALITY OF MESSAGES

Kurt Hagenhaus, Berlin-Siemensstadt, Germany, assignor to Siemens & Halske Aktiengesellschaft, Munich, Germany, a corporation of Germany Application February 20, 1953, Serial No. 338,112

Claims priority, application Germany March 11, 1952

8 Claims. (Cl. 179—15)

Figure 1:
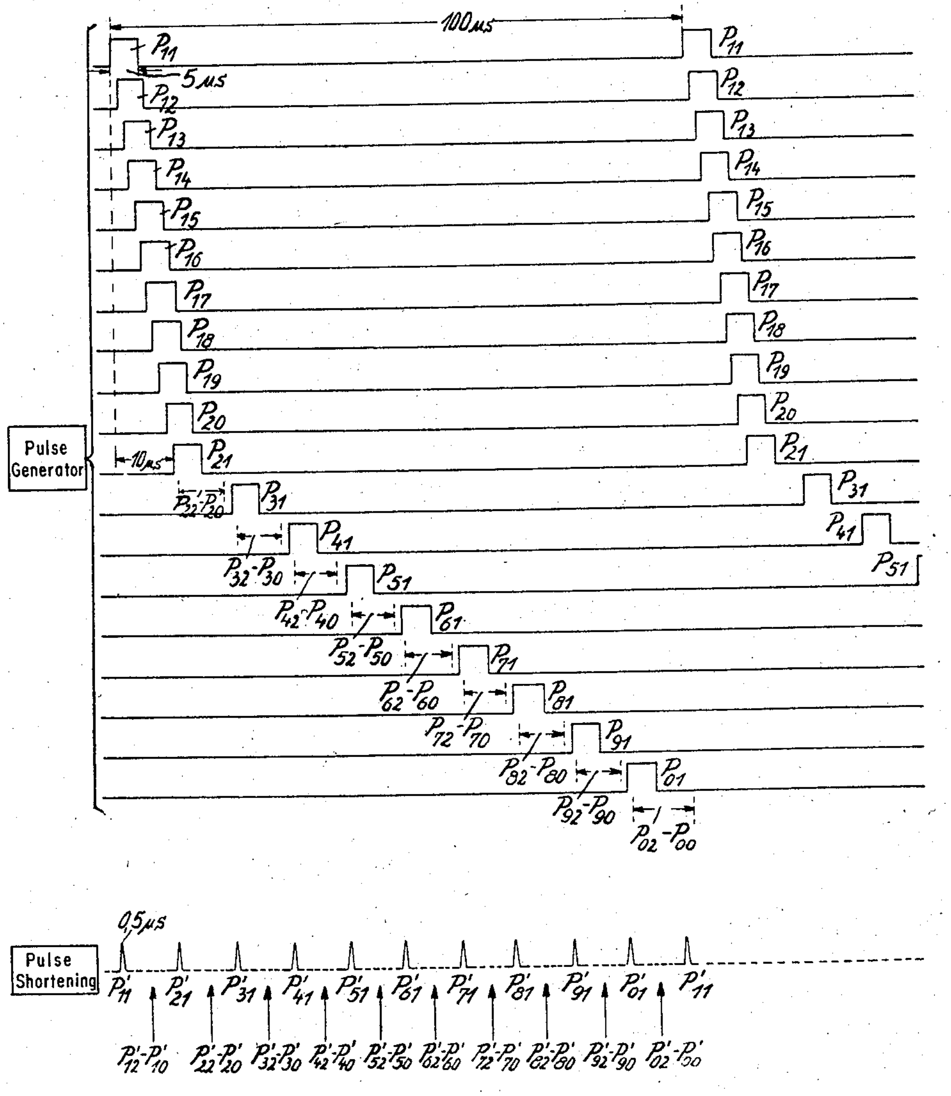

This invention relates to the transmission of messages in signalling systems and is particularly concerned with circuit arrangements for substantially simultaneously transmitting a plurality of telephone messages over a common transmission or connecting channel.

In order to transmit a plurality of messages practically simultaneously over a common transmission channel which may extend over physical lines or which may be built up wireless by employing a high frequency carrier, pulses are used for each message which recur in certain rhythm or periodic sequence and which are modulated by the corresponding message, e. g., as to amplitude. Interspersed with the recurring pulses of one message but displaced relative as to time are the modulated pulses of another practically simultaneously transmitted message which recur in the same periodic sequence or rhythm as the pulses of the first message. Each sequence of pulses recurring in the same rhythm therefore forms a transmission or message channel.

For example, if it is assumed that 100 subscribers' lines have access to such a common transmission channel, there will be required 100 pulses each of which may be associated, e. g., with one of the 100 subscribers' lines. Each pulse serves in such a case incident to its periodic transmission for forming one transmission channel, resulting in 100 channels. If all the subscribers should happen to be engaged in calls, 100 pulses will be successively transmitted over the common channel, and these pulses, the duration of which may be shortened will thereafter be repeatedly transmitted in the same rhythm for the duration of the calls. Each individual pulse is in such a case a carrier for portions of its corresponding message due to modulation thereof by such message.

The called subscribers' lines which are to receive the individual messages are connected to the common transmission channel at the instant of receipt of the corresponding message-modulated pulses. This may be accomplished, for example, by valve devices (input gates) which are opened in step with the successively transmitted pulses assigned to the respective lines, the opening of such gates thus in a sense extracting, impulsewise, from the intermixture of messages, the individual message portions of the corresponding messages.

Since the effective power or capacity of the transmitted messages is as compared with continuous transmission considerably reduced, due to the impulsewise scanning in accordance with the scanning ratio, it is necessary to amplify the messages transmitted to the individual lines.

In order to keep the required expenditure as small as possible the invention provides a common connection stage (group connection device) for the subscribers' lines whose pulses exhibit a mutual spacing which is a multiple of the spacing of the individual pulses which are displaced or staggered as to time. This connecting device is interconnected with the common transmission channel, by such a tube circuit responsive to pulses which are modulated with message portions for the corresponding group of lines. The tube circuit serves at the same time for expanding the incoming pulses and if desired for amplifying such pulses.

Figure 1A:
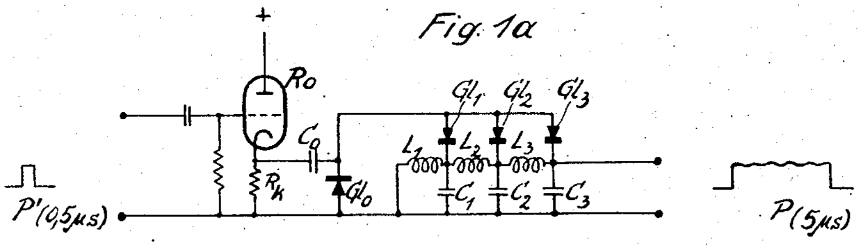
Figure 3:
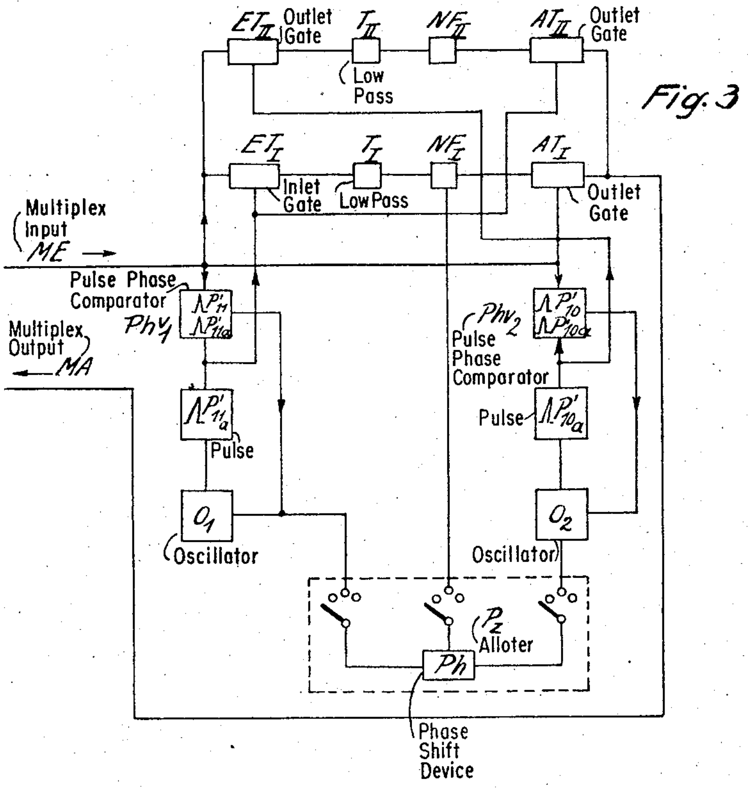
Figure 2:
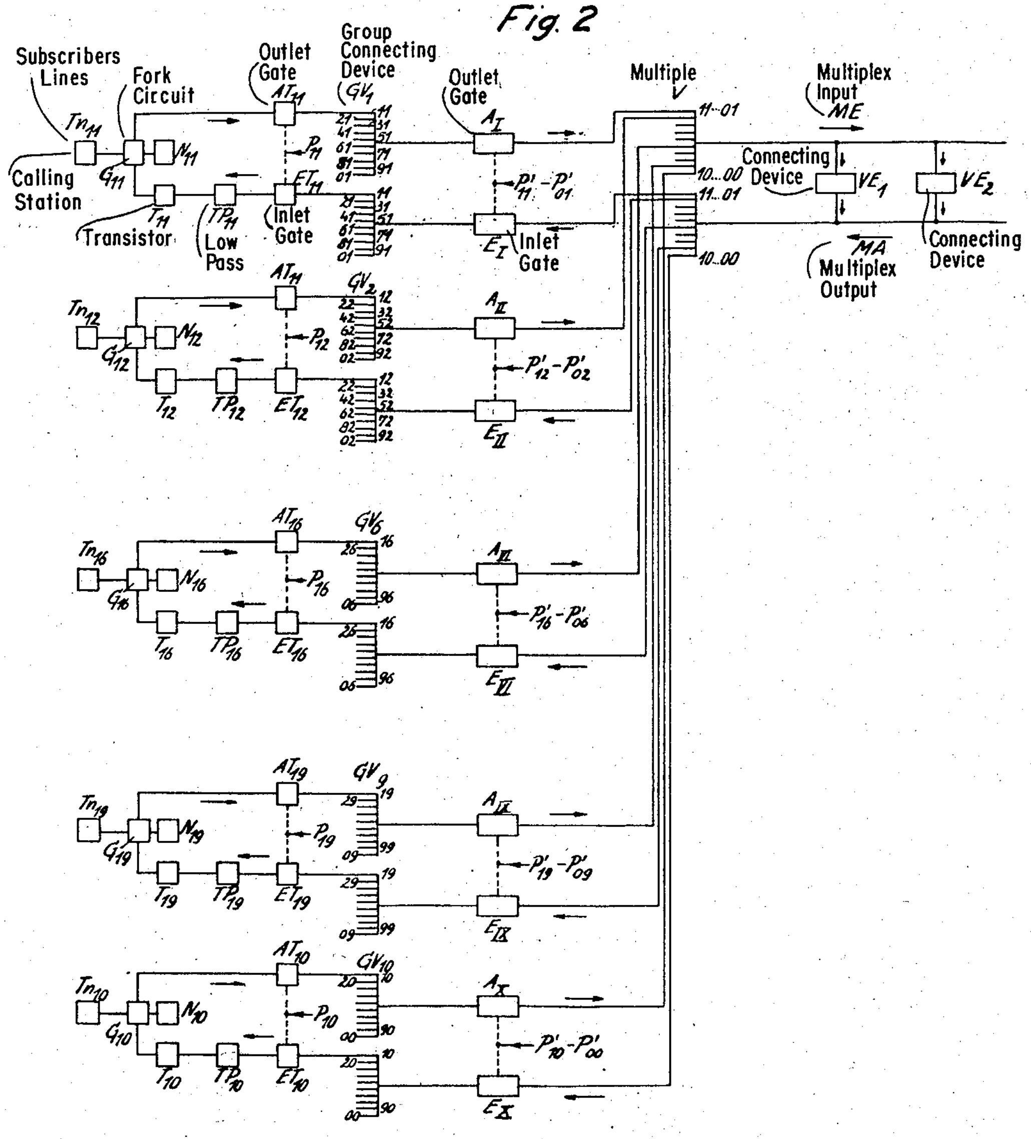
Figure 4:
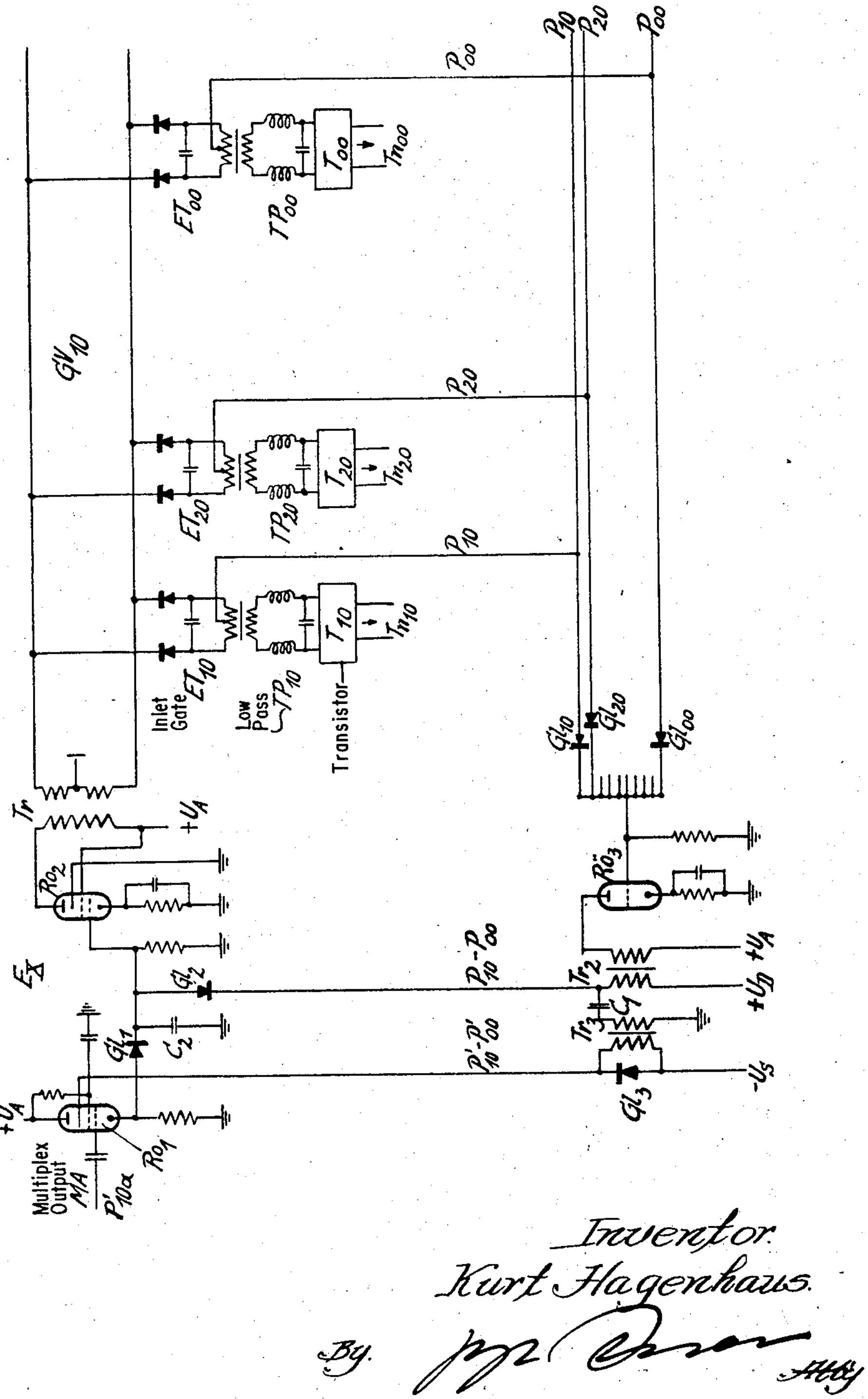
Figure 5:
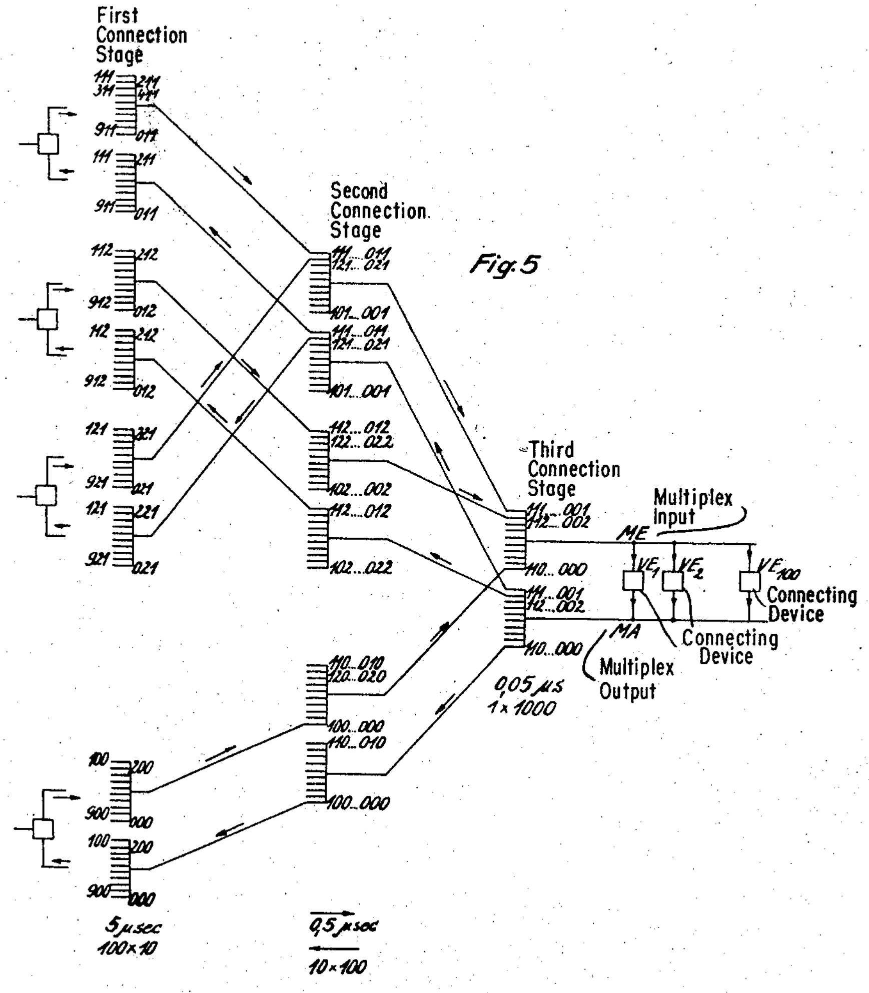
Figure 6C:
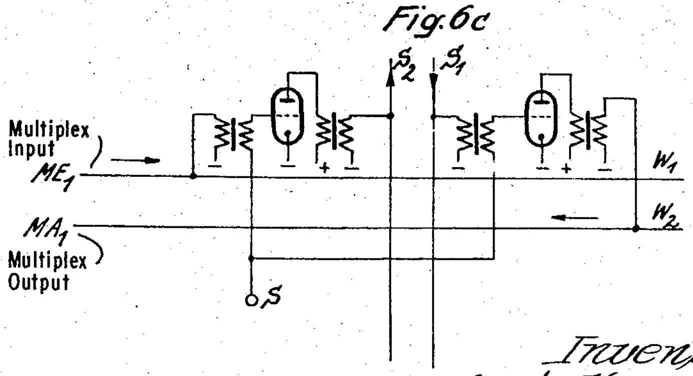
Figure 6:
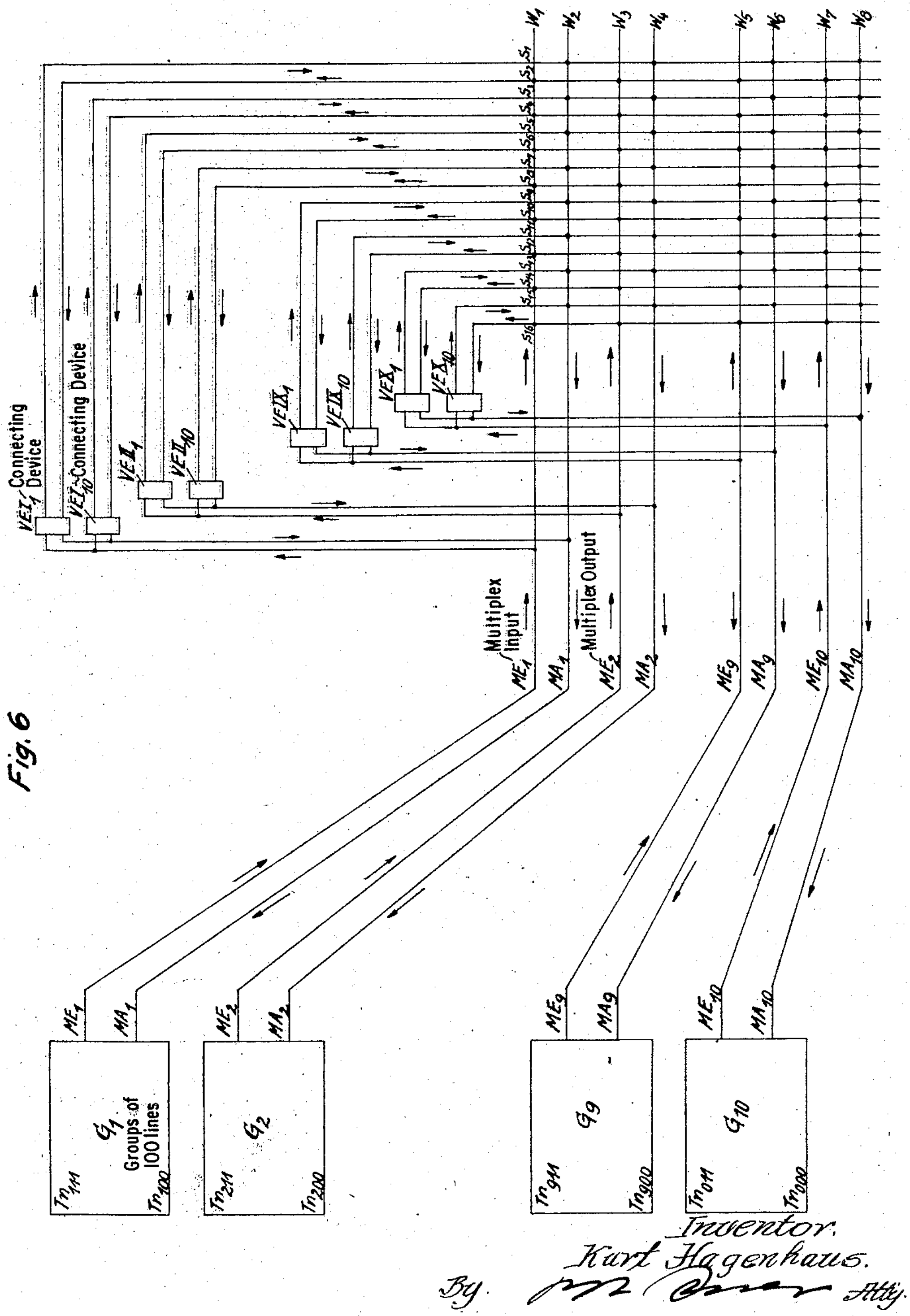

The invention will now be described with reference to the accompanying diagrammatic drawings wherein:

Fig. 1 shows in its top portion pulses derived from a main oscillator while the bottom portion indicates the corresponding shortened pulses;

Fig. 1*a* indicates a circuit for expanding the shortened derived pulses from the oscillator;

Figs. 2 to 4 illustrate circuit examples for a system having 100 subscribers' lines, Fig. 2 representing a wiring scheme for the 100 lines; Fig. 3 showing in schematic manner the electronic connection devices of the common transmission channel; and Fig. 4 illustrating a group of 100 lines with the arrangement serving for the connection thereof;

Fig. 5 indicates in diagrammatic manner a network for 1000 subscribers;

Fig. 6 shows diagrammatically a network for 1000 lines wherein the common transmission channel is formed by a selection stage; and Figs. 6*a*–6*d* indicate modifications of the structural features of the selection stage.

Referring now to Fig. 1, a suitable generator or oscillator is used which delivers a certain frequency (e. g., 10 kc.) from which are derived in periodic sequence 100 pulses $P_{11} \ldots P_{00}$. These pulses are, for example, transmitted during a time of 100 μsec. Each pulse is transmitted for a duration of 5 μsec. and the pulses therefore partially overlap as indicated in connection with the pulses $P_{11} \ldots P_{21}$. The leading flanks of the pulses are spaced by 1 μsec. The leading flanks of the pulses $P_{11}$, $P_{21}$, $P_{31}$, etc. to $P_{01}$ are always spaced by 10 μsec. The pulses $P_{22} \ldots P_{20}$, $P_{32} \ldots P_{30}$, etc. have been omitted to simplify representation. The leading flanks are, as indicated, between the leading flanks of the pulses $P_{21} \ldots P_{31}$, $P_{31} \ldots P_{41}$ and so forth.

The pulses $P_{11} \ldots P_{00}$ are respectively associated with individual subscriber's lines such as the lines $Tn_{10} \ldots Tn_{00}$ indicated in Fig. 2. They are made effective, for serving in the connection of a desired line, in accordance with a certain grouping scheme which will be explained presently.

The pulses $P_{11} \ldots P_{00}$ of approximately 5 μsec. duration are by differentiation shortened, resulting in the sequence shown in the lower part of Fig. 1 at $P'_{11} \ldots P'_{00}$. These pulses have been shortened to 0.5 μsec. and therefore do not overlap. The shortened pulses $P'_{11} \ldots P'_{00}$ need not lie, as indicated in Fig. 1 and as seen in point of occurrence at the leading flanks of the pulses $P_{11} \ldots P_{00}$ but may lie midway of such pulses. The advantage which is thereby obtained is, that time and phase variations are not detrimental to extracting from the pulses the corresponding portions of the messages. The significance of the shortening of the pulses will be explained presently.

The arrangement may also be formed so that the shortened pulses $P'_{11} \ldots P'_{00}$ are derived from the pulses of the main oscillator and are thereafter transformed into the pulses $P_{11} \ldots P_{00}$ by expansion thereof, e. g., by means of a device as indicated in Fig. 1*a*.

Referring to Fig. 1*a*, one of the pulses $P'_{11} \ldots P'_{00}$ of 0.5 μsec. duration, indicated in simplified manner by P' (0.5 μs.) reaches the grid of the tube R*o*. At the cathode resistor $R_k$ this pulse will appear in its original form, but with a gain in power. The capacitors $C_1$, $C_2$ and $C_3$ are simultaneously charged over the capacitor $C_0$ and the rectifiers $Gl_1$, $Gl_2$ and $Gl_3$. The capacitor $C_0$ is thereby likewise charged, such that its coating which faces the cathode becomes positive. All capacitors are thus charged at the conclusion of the pulse. The undesired charge of the capacitor $C_0$ is discharged through the rectifier $Gl_0$. The capacitors $C_1 \ldots C_3$ cannot discharge through the rectifiers $Gl_1 \ldots Gl_3$, the latter blocking the discharge. The capacitors $C_1 \ldots C_3$ and the associated inductance coils $L_1 \ldots L_3$ now form a circuit which is shunted at the side facing the tube R*o* causing a discharge which increases the effect. The charges are dissipated toward the output side and result in the expanded pulse P of 5 $\mu$sec. duration as indicated at P (5 $\mu$s.).

As will be seen from Fig. 2, there are provided 100 subscribers' lines $Tn_{11} \ldots Tn_{00}$. In the example shown, there are formed groups each having 10 lines. The subscribers' lines $Tn_{11}$, $Tn_{21}$ and so forth to $Tn_{01}$ have access to the group connecting device $GV_1$; the lines $Tn_{12}$, $Tn_{22} \ldots Tn_{02}$ have access to the group connecting device $GV_2$; the lines $Tn_{16}$, $Tn_{26} \ldots Tn_{06}$ reach the group connecting device $GV_6$; the lines $Tn_{19} \ldots Tn_{09}$ reach the group connecting device $GV_9$; the lines $Tn_{10} \ldots Tn_{00}$ reach the group connecting device $GV_{10}$.

The subscriber's line which at any time calls later is connected by its outlet gate, which is periodically opened by the pulse assigned to the respective line, with the corresponding group connecting device. Thus, the line $Tn_{11}$ is connected with the group connecting device $GV_1$ over its outlet gate $AT_{11}$ upon occurrence of the pulse $P_{11}$; the line $Tn_{21}$ (not shown) is connected by its associated similar outlet gate $AT_{21}$ upon occurrence of the pulse $P_{21}$ with the group connecting device $GV_1$, and so forth.

It will be seen therefore that the connections of the individual subscriber's lines with the associated group connecting devices take place at different successively occurring instances. The same is true so far as the connection of the remaining lines with the other group connecting devices is concerned.

The individual group connecting devices thus form the first connecting stage and reach over outlet gates such as $A_I \ldots A_X$, which are in each instant opened by pulses of the particular subscriber's line connected to the respective group connecting devices, a multiple V forming the second connecting stage and over this multiple they reach the inlet end ME of a multiplex device constituting the common transmission or channel. The pulses serving the opening of the outlet gates are shortened, that is, they are the differentiated pulses indicated at the bottom of Fig. 1. Their duration is 0.5 $\mu$sec.

For example, if it is assumed that the subscriber's line or station $Tn_{11}$ originates a call, the outlet gate $AT_{11}$ now associated with such line is periodically or rhythmically opened by the pulses $P_{11}$ which are individual to the calling line and the calling line $Tn_{11}$ is correspondingly periodically connected with the group connecting device $GV_1$. This group connecting device is periodically connected with the multiplex inlet ME, over the multiple V, by the shortened pulses $P'_{11} \ldots P'_{01}$ corresponding to the lines $Tn_{11} \ldots Tn_{01}$.

Similar operations occur responsive to a call originating, for example, at the subscriber's station $Tn_{21}$. Such station will be periodically connected in the same time sequence, but at different instances, by means of the pulse $P_{21}$ associated therewith, over a similar outlet gate (not shown), with the group connecting device $GV_1$ and the latter will be periodically connected with the inlet of the multiplex device ME over the outlet gate $A_I$ and the multiple V.

Each calling line is operatively conected with the multiplex device by a connecting device. For example, the line $Tn_{11}$ which has been assumed to have called first, will connect with the connecting device $VE_1$. The connecting device $VE_1$ is effected in a manner to be described presently, by the dial pulses from the calling line which designate the called line, for example, line $Tn_{10}$ (the previously mentioned pulses serving as a carrier for the dial pulses) so as to produce a pulse transformation corresponding to the called line. It causes transmission of the pulse $P'_{10}$ associated with the called line which has been shortened (0.5 $\mu$sec.), from the multiplex outlet MA over the multiple V to the inlet gate $E_I \ldots E_X$. Of these inlet gates, only the gate $E_X$ will switch through to the group connecting device $GV_{10}$, responsive to receipt of the pulses $P'_{10}$, due to circuit means which will be explained presently. The pulses $P_{10}$ (5 $\mu$sec. duration) which are associated with the called line $Tn_{10}$ are also transmitted to the inlet gate $ET_{10}$ and the latter is accordingly periodically opened. Therefore, when the shortened pulse $P'_{10}$ (0.5 $\mu$sec.) opens the inlet gate $E_X$, the inlet gate $ET_{10}$ will be simultaneously opened by the unaltered or non-shortened pulse $P_{10}$ (5 $\mu$sec.). The inlet gate $ET_{10}$ therefore is opened for a longer interval (non-shortened pulse $P_{10}$) than the gate $E_X$. The pulse $P'_{10}$ received by the inlet gate $E_X$ which has a duration of about 0.5 $\mu$sec. and which has been modulated by part of the message is expanded by a device shown in Fig. 4, which will be described later on, which is associated with the group connecting device $GV_1$, and is if desired subsequently amplified. Costly amplifiers at the individual subscribers' lines are avoided by the power increase obtained by the expansion of the pulses. If the transmitted power does not suffice, the subscriber's station may be provided with semi-conductor amplifiers of the transistor type or with simple amplifier tubes.

In order to carry out the above indicated expansion of the message-carrying pulses, the various subscribers' lines are grouped so that they are always on a group connecting device whose associated pulses exhibit a spacing which exceeds that of the expanded pulse. In the assumed example, those lines are connected with the same group connecting device whose pulses referred to the leading pulse flanks exhibit a spacing of 10 $\mu$sec. Accordingly, the lines $Tn_{11} \ldots Tn_{01}$ (pulses $P_{11}$, $P_{21} \ldots P_{01}$) are connected with the group connecting device $GV_1$; the lines $Tn_{12}$, $Tn_{22} \ldots Tn_{02}$ (pulses $P_{12}$, $P_{22} \ldots P_{02}$) are connected with the group connecting device $GV_2$, and so forth.

The transmission of messages over the common transmission channel will now be described somewhat more in detail by explaining with reference to Fig. 4 the pulse expansion and the subsequent periodic connection of the individual subscribers' lines with their associated group connection devices.

It has been assumed that the message from the calling station $Tn_{11}$ (Fig. 2, fork circuit $G_{11}$) is transmitted over the circuits for the outlet gate $AT_{11}$, group connecting device $GV_1$, outlet gate $A_I$, multiple V, multiplex inlet ME, connecting device $VE_1$, multiple V, inlet gate $E_X$, group connecting device $GV_{10}$, inlet gate $ET_{10}$, and additional elements (low pass $TP_{10}$, transistor amplifier $T_{10}$) to the desired line $Tn_{10}$. The message in opposite direction, from the called station $Tn_{10}$ to the calling station $Tn_{11}$ is transmitted over the fork circuit $G_{10}$, outlet gate $AT_{10}$, group connecting device $GV_{10}$, outlet gate $A_X$, multiple V, multiplex inlet ME to the connecting device $VE_1$. In this connecting device is obtained the transformation from the pulse $P'_{10}$ to the pulse $P'_{11}$ of the calling line, so that the further transmission path extends over the multiple V, inlet gate $E_I$, group connecting device $GV_1$, inlet gate $ET_{11}$, low pass $TP_{11}$, transistor $T_{11}$ to the calling line $Tn_{11}$. The outlet gate $AT_{10}$ is thereby periodically opened for 5 $\mu$sec., by the non-shortened pulse $P_{10}$ associated with the called line $Tn_{10}$ and the outlet gate $A_X$ is opened for shorter periods by the shortened pulse $P'_{10}$ of 0.5 $\mu$sec.

For the connection of the subscriber station $Tn_{10}$ there is however available only the interval of simultaneous opening of the outlet gates $AT_{10}$ and $A_X$. If there exist other calls, the outlet gate $A_X$ will be periodically opened at other instances by the corresponding pulses, e. g., $P'_{20} \ldots P'_{00}$. The outlet gates $AT_{20}$ etc. of the other stations $Tn_{20} \ldots Tn_{00}$ are periodically opened at corresponding times as soon as their pulses $P_{20} \ldots P_{00}$ become effective. At the calling end (line $Tn_{11}$) will be opened the inlet gate $E_I$ by the pulse $P'_{11}$—0.5 μsec., and the inlet gate $ET_{11}$ by the pulse $P_{11}$—5 μsec. The connecting device $VE_1$ carries out the previously indicated transformation of the pulse $P'_{11}$ to the pulse $P'_{10}$ and the pulse $P'_{10}$ to the pulse $P'_{11}$, respectively.

The manner in which the pulse transformation is carried out will now be explained with reference to the block diagram shown in Fig. 3.

As already mentioned, between the multiplex inlet ME and the multiplex outlet MA are disposed a number of connecting devices, two being shown in Fig. 2 at $VE_1$ and $VE_2$, the number of such devices being in accordance with the number of simultaneous calls to be expected over the multiplex line. The connecting device, e. g., the device $VE_1$ comprises the elements schematically indicated in Fig. 3. There are provided two oscillators $O_1$ and $O_2$. The frequencies of these oscillators deviate by a few cycles from the frequency of the main oscillator from which are derived the pulses $P_{11} \ldots P_{00}$ as explained with reference to Fig. 1. When the pulse derived from the main oscillator and subsequently shortened (pulse $P'_{11}$—0.5 μsec.) appears in the multiplex input ME, responsive to a call from the subscriber station $Tn_{11}$, a regulating or control voltage will be produced in the pulse-phase comparator $Phv_1$, at the instant of deviation existing between the pulse $P'_{11}$ and the pulse derived from the oscillator $O_1$. This regulating or control voltage serves for restoring phase synchronism between the oscillator $O_1$ and the main oscillator (not shown) so that the pulses $P'_{11}$ and $P'_{11a}$ occur at the same instant. The pulse $P'_{11}$ at the multiplex inlet ME is upon synchronizing so transformed or altered by a counter pulse from a device (not shown) that other connecting devices cannot partake in the synchronizing. The pulse $P'_{11a}$ opens the inlet gate $ET_I$ in correct phase so that the low frequency message appears in the device $NF_I$ in back of the low pass $T_I$.

The dial pulses which designate the desired subscriber cause setting of an idle phase shift device $Ph$ which has been made available by an allotter $Pz$ so as to derive from the oscillator $O_2$ the pulse $P'_{10a}$ the phase position of which corresponds to the pulse $P'_{10}$, of the desired subscriber, which is derived from the main oscillator. This pulse $P'_{10a}$ is used to transmit a ring from the pulse allotter $Pz$ over the degice $NF_I$, outlet gate $AT_I$, multiplex outlet MA, multiple V, inlet gate $E_X$, group connecting device $GV_{10}$, inlet gate $ET_{10}$, low pass $TP_{10}$, transistor $T_{10}$, fork circuit $G_{10}$, to the desired party $Tn_{10}$.

If the called party $Tn_{10}$ answers, its pulse $P_{10}$ will appear in back of its outlet gate $AT_{10}$ at the group connecting device $GV_{10}$, which reaches the multiplex inlet ME as a shortened pulse $P'_{10}$ over the outlet gate $A_X$ and the multiple V. The pulse phase comparator $Phv_2$ now causes synchronization of the pulses $P'_{10}$ and $P'_{10a}$ in a similar manner as explained with reference to the pulse phase comparator $Phv_1$. The phase shift device $Ph$ which had been connected by the allotter $Pz$ is now released.

The synchronized pulse $P'_{10a}$ opens the outlet gate $AT_I$ in step with the pulses $P_{10}$ so that the message of the party $Tn_{11}$ is transferred from the pulse $P'_{11}$ to the pulse $P'_{10}$ of the desired party $Tn_{10}$. In the opposite direction, the inlet gate $ET_I$ and the outlet gate $ET_{II}$ are respectively controlled by the pulses $P'_{10a}$ and $P'_{11a}$.

Accordingly, when the party $Tn_{11}$ calls the party $Tn_{10}$, the pulse $P'_{11}$ carrying the message parts is transferred to the pulse $P'_{10}$ while the pulse $P'_{10}$ is transformed to the pulse $P'_{11}$ in opposite direction from the party $Tn_{10}$ to the party $Tn_{11}$. The party talking at any instant is therefore on the side of the multiplex input ME while the listening party is on the side of the multiplex output MA.

The devices disposed at the multiplex output MA so far as they concern the invention in connection with the subscriber lines $Tn_{10}$, $Tn_{20} \ldots Tn_{00}$ are indicated in Fig. 4. If the subscriber $Tn_{10}$ is desired, as has been assumed, the shortened pulse $P'_{10a}$ (0.5 μsec.) which is modulated with the corresponding message part is periodically transmitted from the connecting device $VE_1$ as already explained with reference to Fig. 3. This modulated pulse appears at the inlet gates $E_I \ldots E_X$ shown in Fig. 2. However, it becomes effective only at the inlet gate $E_X$ because only this gate receives the pulse $P'_{10}$ derived from the main oscillator. The above indicated operations are apparent from Fig. 4 which will now be described more in detail.

As will be seen from Fig. 4, the non-shortened pulse $P_{10}$ (5 μsec.) derived from the main oscillator reaches the grid of the tube $Ro_3$ over the rectifier $Gl_{10}$. The pulse $P_{10}$ is amplified and directed over the transformer $Tr_2$ to the differentiating element comprising the capacitor $C_1$ and primary winding of the transformer $Tr_3$; the differentiated pulse $P_{10}$ (0.5 μsec.) is derived from the secondary winding of the transformer $Tr_3$ and is conducted to the suppression grid of the tube $Ro_1$ at such a potential and in step with the pulse $P'_{10}$, that the tube becomes conductive, provided that its control grid receives at such instant the modulated pulse $P'_{10a}$ from the multiplex output MA. This operation corresponds to the periodic opening of the inlet gate $E_X$ shown in Fig. 2. The pulse $P'_{10a}$ modulated with the corresponding message part charges the capacitor $C_2$ over the rectifier $Gl_1$. The potential on the capacitor $C_2$ therefore follows the peak value of the modulated pulse $P'_{10a}$ and therewith its modulation by the corresponding message part. The capacitor $C_2$ cannot discharge for the duration of 5μsec. after its charging interval because in its discharge path is disposed the rectifier $Gl_2$ as a valve carrying during this interval a blocking potential from the secondary winding of the transformer $Tr_2$ in accordance with the pulse $P_{10}$. When the blocking potential disappears at the end of the pulse $P_{10}$, that is, after 5 μsec., the capacitor $C_2$ will discharge over the rectifier $Gl_2$ allowing charging again in accordance with the successive modulated pulse $P'_{10a}$. The modulated pulses $P'_{10a}$ of 0.5 μsec. duration are thus expanded to 5 μsec.

If there are at such time connections between other lines belonging to the same group, for example, the lines $Tn_{20} \ldots Tn_{00}$, there will be additionally transmitted from the multiplex outlet MA to the grid of the tube $Ro_1$ the correspondingly modulated pulses $P'_{20a} \ldots P'_{00a}$, each of 0.5 μsec. duration. The capacitor $C_2$ is thus charged and discharged in the intervals of its charging by the modulated pulse $P'_{10a}$ thus permitting extraction of message parts belonging to the other lines. The corresponding pulses are also expanded, each to 5 μsec. duration. Mutual disturbance or interference between the various message portions does not occur because the modulated pulses $P'_{10a} \ldots P'_{00a}$ (0.5 μsec.) which appear at the grid of the tube $Ro_1$ are always spaced by 10 pulses.

The individual expanded pulses appear at the grid of the tube $Ro_2$ where they are amplified and directed over the transformer $Tr$ to the group connecting device $GV_{10}$. To this device may be connected the lines $Tn_{10}, Tn_{20} \ldots Tn_{00}$ over the inlet gates $ET_{10}, ET_{20} \ldots ET_{00}$ which are formed as modulators or controlled rectifiers. The modulator of the inlet gate $ET_{10}$ is opened because the pulse $P_{10}$ (5 μsec.) appears simultaneously with the expanded modulated pulse $P'_{10a}$ and the modulated amplified and expanded pulse $P'_{10a}$ therefor can pass. The control frequency parts are filtered out in the low pass filter $TP_{10}$ and the remaining message is conducted to the line $Tn_{10}$ either without further amplification or over a transistor $T_{10}$ or a suitable simple amplifying tube and over the fork circuit $G_2$ shown in Fig. 2. The messages for other subscribers which are connected to the group connecting device $GV_{10}$ are similarly transmitted by the opening of the inlet gates under control of the associated non-shortened pulses responsive to simultaneous appearance of the correspondingly modulated pulses.

It will be clear from the foregoing explanations that the message from a calling line or party is conducted, first, with a pulse duration of 5 $\mu$sec. to the associated group connecting device, e. g., $GV_1$ forming the first connecting stage, and second, with a shortened pulse duration of 0.5 $\mu$sec. from the multiple V as the second connecting stage, to the tube circuit such for example as $E_X$, with subsequent expansion to a duration of 5 $\mu$sec. ahead of the group connecting device, e. g., $GV_{10}$.

The arrangement may also provide for directly transmitting the message from the calling end with shortened pulses and to carry out the expansion of the pulses at the called end only ahead of the group connecting device, e. g. $GV_{10}$. If the line $Tn_{11}$ is for example assumed to be calling, its outlet gate $AT_{11}$ will in such a case not be periodically opened by the pulse $P_{11}$ (5 $\mu$sec.) but by the pulse $P'_{11}$ (0.5 $\mu$sec.). The expansion at the called end is then carried out as already described. Lines having associated therewith pulses which exhibit a spacing that permits such expansion may be disposed in groups and connected with the identical group connecting device which is common thereto. The expansion and amplification of the pulse is then carried out by an amplifier device in the group connecting device which is common to such a group of subscribers' lines. Costly amplifier devices for the corresponding individual lines are thus avoided.

As shown in Fig. 5, if the system has 1000 lines, the first connection stage will comprise 100 group connecting devices each with 10 lines (111, 211 . . . 011; 112, 212 . . . 012 etc.), forming as a second connection stage 10 group connecting stages each having 100 stations. These latter group connection stages are then united in a multiple circuit with 1000 stations as the third connection stage. The multiple circuit then extends again to a multiplex device. Since 1000 associated pulses fill in such a case an interval of 100 $\mu$sec., the lines having pulses which are spaced by 100 pulses (not by 10 pulses as explained before) will be gathered in groups, so as to carry out the pulse expansion, i. e., as shown in Fig. 5. The groups will for example comprise the lines $Tn_{111}$, $Tn_{211}$ . . . $Tn_{011}$, then the lines $Tn_{112}$, $Tn_{212}$ . . . $Tn_{012}$, and so forth, each group connected with a group connecting device as the first connecting stage and the other groups correspondingly with the remaining 99 group connecting devices. The pulse duration is thereby shortened from one to the next connecting stage, i. e., from 5 $\mu$sec. in back of the first connecting stage to 0.05 $\mu$sec. in back of the third connecting stage at the multiplex input ME. In the direction of the desired line, that is, from the third to the first connection stage, the pulse duration will again be expanded so as to reach 5 $\mu$sec. at the group connection device of the desired line.

Fig. 5 shows only the general wiring scheme of the individual connection stages without the required inlet and outlet gates as well as the other elements which have been already explained with reference to Figs. 2–4. In such a grouping of the subscriber lines and subdivision of the transmission channel there will appear the following advantage, due to the reduction from stage to stage of the pulse duration from 5 $\mu$sec. to 0.5 $\mu$sec. and then to 0.05 $\mu$sec.:

The first connection stage which comprises a great number of group connecting devices (100) and which has due to the pulse duration of 5 $\mu$sec. a basic frequency, e. g., of 500 kc., in view of this basic frequency does not require an excessive expenditure so far as cabling and amplification are concerned.

The second connecting stage having a lesser number of group connecting devices, which have been reduced, for example, by the factor 10, and which has due to the pulse duration of 0.5 $\mu$sec. a higher basic frequency (5 mc.), requires in view of this higher basic frequency a greater expenditure but a lesser number of units.

The third connecting stage has due to the pulse duration of 0.05 $\mu$sec. the highest limit frequency (about 50 mc.) and therefore requires the greatest expenditure. This is however bearable since there is only one such connecting stage.

Aside from the advantages described above, there remains of course the advantage that the damping of the transmission of the entire system is reduced by the pulse expansion at the called end of the connections.

The special expenditure so far as cabling and amplification are concerned may now be avoided in the third stage, if such stage is eliminated by forming the common transmission channel which is reached by all subscriber lines, as a selection stage. Fig. 6 which will be described next shows an example how this may be done.

The system has, as also assumed in Fig. 5, 1000 lines. Each rectangle shown at the left of Fig. 6 represents a group of 100 lines which are grouped according to the scheme shown for 100 stations in Fig. 2. The lines of the hundreds groups thus formed, namely, groups $G_1$ . . . $G_{11}$ reach their respective multiplex input and output over corresponding connecting stages as shown in Fig. 2. The first hundreds group $G_1$ which comprises the lines $Tn_{111}$ . . . $Tn_{100}$ reaches the multiplex input $ME_1$ and output $MA_1$. The second hundreds group $G_2$, comprising the lines $Tn_{211}$ . . . $Tn_{200}$, reaches the multiplex input $ME_2$ and output $MA_2$. The ninth hundreds group $G_9$ with its lines $Tn_{911}$ . . . $Tn_{900}$ reaches the multiplex input $ME_9$ and the output $MA_9$; and the tenth hundreds group $G_{10}$ with the lines $Tn_{011}$ . . . $Tn_{000}$ reaches the multiplex input $ME_{10}$ and the output $MA_{10}$.

Connecting devices are wired with the multiplex input $ME_1$ and with the corresponding output $MA_1$ which correspond in number to the number of expected simultaneous calls. In the example shown in Fig. 6 there are assumed to be provided ten such connecting devices, only two of such devices $VE_1$ and $VE_{10}$ being shown. The other side of each of these connecting devices is connected with vertical bars $s_1$ and $s_2$ of a cross-bar multiple. The multiplex input $ME_1$ is in addition connected with horizontal bars $w_1$ and the multiplex output $MA_1$ is similarly connected with horizontal bars $w_2$. The multiplex inputs and outputs of the remaining hundreds groups are similarly connected with the cross-bar multiple. In order to connect over the crossbar multiple each line with each other line in the system, there are provided between the vertical and horizontal bars selectively operable switching means as indicated in Fig. 6 by the dots at the crossbar crossing points.

In this system, connections are built up as follows:

If a connection is to be extended from the subscriber line $Tn_{111}$ to the line $Tn_{900}$, the calling line $Tn_{111}$, as described in connection with Fig. 2, will reach its associated group connecting device over its outlet gate (associated pulse $P_{11}$=5 $\mu$sec.); from there the outlet gate of such group connecting device (pulse $P'_{11}$=0.5 $\mu$sec.); and finally over the multiple circuit the multiplex input $ME_1$. If the connecting device $VEI_1$ is idle, it will serve among other things, as explained in connection with Fig. 3, for transferring the pulse $P'_{11}$ of the calling line to the pulse $P'_{00}$ of the called line. The calling subscriber $Tn_{111}$ is also connected, over the connecting device $VEI_1$, to the vertical bar $s_1$ of the crossbar multiple which will subsequently be connected with the corresponding horizontal bar depending on the succeeding group marking of the called line, that is, depending on the first digit transmitted from the calling line. Since the subscriber's line $Tn_{900}$ is called, i. e., the ninth hundreds group $G_9$, the first series of dial pulses consisting of nine pulses, will connect the vertical bar $s_1$ with the horizontal bar $w_6$, such switching connection being made at the corresponding crossing points of the bars. The vertical bar $s_2$ is at the same time connected with the horizontal bar $w_5$ at the corresponding crossing point indicated in Fig. 6. The multiplex input $ME_1$ is in this manner connected with the multiplex output $MA_9$ over the connecting device $VEI_1$ by way of the vertical bar $s_1$ and the horizontal bar $w_6$, and the multiplex output $MA_1$ is similarly connected with the multiplex input $ME_1$ over the connecting device $VEI_1$ by way of the vertical bar $s_2$ and the horizontal bar $w_5$. The further marking of the called line by the succeding series of dial pulses O and O (each consisting of 10 impulses) causes the connecting device $VEI_1$, in the manner described in connection with Fig. 3, to transmit the pulse $P'_{00a}$, thereby causing the multiplex output $MA_9$ in the hundreds group $G_9$ to periodically connect the subscriber line $Tn_{900}$ as already described in connection with Fig. 2.

When the called line $Tn_{900}$ answers, it will be connected with the multiplex input $ME_9$ by the operations governed by its associated pulse $P_{00}=5$ μsec., as described with reference to Fig. 2. Since the multiplex input $ME_9$ is connected with the horizontal bar $w_6$ and the latter with the vertical bar $s_2$, there will be established a connection with the multiplex output $MA_1$ by way of the connecting device $VEI_1$. As explained in describing Fig. 3, the connecting device $VEI_1$ transforms the pulse $P'_{00}$ into the pulse $P'_{11}$ and the latter pulse periodically connects the line $Tn_{111}$ with the multiplex output $MA_1$ over the multiplex output $MA_1$ in the hundreds group $G_1$.

It will be seen therefore that the message outgoing from the line $Tn_{111}$ reaches the desired line $Tn_{900}$ from the multiplex input $ME_1$ over the connecting device $VEI_1$ and the crossbar multiple to the multiplex output $MA_9$. The message in the opposite direction, from the line $Tn_{900}$ to the line $Tn_{111}$ is transmitted from the multiplex input $ME_9$ over the crossbar multiple and the connecting device $VEI_1$ to the multiplex output $MA_1$.

If a connection is to be handled at the same time from the line $Tn_{200}$ to the line $Tn_{911}$, the calling line $Tn_{200}$ will reach the multiplex input $ME_2$ by means of its associated pulse $P_{00}$ and $P'_{00}$, respectively. This multiplex input $ME_2$ is connected with an idle connecting device, e. g., $VEII_{10}$. The transmission of the first digit "9" will cause connection of the vertical bar $s_7$ with the horizontal bar $w_6$ and vertical bar $s_8$ with the horizontal bar $w_5$. The multiplex input $ME_2$ is now connected with the multiplex output $MA_9$ and the input $ME_9$ with the output $MA_2$. The two succeeding digits transmitted by the calling party $Tn_{911}$ which correspond to the last two digits "1" and "1" of the called party $Tn_{911}$ cause the connecting device $VEII_{10}$ to transmit the periodic pulse $P'_{11a}$ which causes in the hundreds group $G_9$ the periodic connection of the station $Tn_{911}$, thus completing the call to the desired party $Tn_{200}$. The pulse $P'_{11}$ is transformed into the pulse $P'_{00}$, in the connecting device $VEII_{10}$, for the transmission of the message in opposite direction, and the line $Tn_{911}$ thus reaches the line $Tn_{200}$ over the multiplex input $ME_9$ by way of the switching point between the vertical bar $s_8$ and the horizontal bar $w_5$ and the connecting device $VEII_{10}$.

Mutual interference between the two messages ($Tn_{111}$/$Tn_{900}$ and $Tn_{200}$/$Tn_{911}$) along the common horizontal bars $w_5$ and $w_6$ does not occur because the corresponding message portions are transmitted over these bars by the pulses $P'_{00}$ and $P'_{11}$, respectively, which become effective at the different instances.

It will be seen that in such a connection, the pulses serving as carriers for the modulation are shortened only to 0.5 μsec., and not to 0.05 μsec. as was the case in the last connecting stage of the example discussed with reference to Fig. 5, because in the example according to Fig. 6, the common transmission channel is formed in a selection stage having different switching branches over which the different messages are built up and transmitted.

The corresponding selection stage need not be formed as a crossbar multiple; the crossing points may be formed by the contacts of relay selectors having relays which are set by the group selection of the calling line and which cause the switching of the crossing points indicated responsive to such group selection.

Figure 6A:
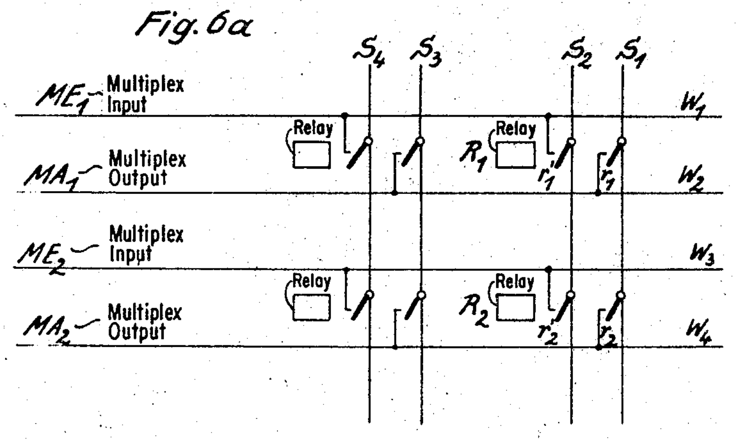

Fig. 6*a* shows in diagrammatic manner an arrangement as noted in the foregoing paragraph. The first impulse will for example energize the relay $R_1$ causing closure of contacts $r_1$ and $r'_1$, thereby interconnecting $s_1/w_2$ and $s_2/w_1$, respectively. The next following impulse series, e. g., digit 2, causes deenergization of relay $R_1$ and energization of relay $R_2$, causing closure of contacts $r_2$ and $r'_2$ and therewith interconnection of $s_1/w_4$ and $s_2/w_3$, respectively. The operations are similar for other digits and for the other interconnecting or switching points (not shown).

Figure 6B:
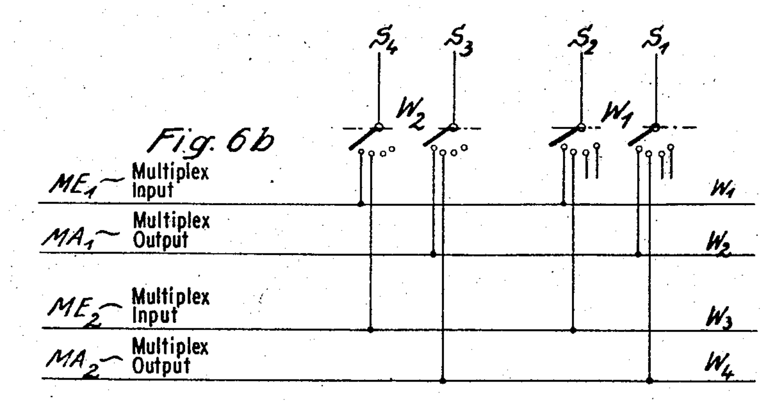

The switching may also be accomplished by the use of switches having wipers. Fig. 6*b* shows a corresponding example. The conductors $s_1$ and $s_2$ terminate, e. g., in the two wipers of a rotary switch $w_1$ which is set by the group selection digit of the calling line upon the contacts to which are connected the multiplex inlet and outlet of the desired hundreds group.

Figure 6D:
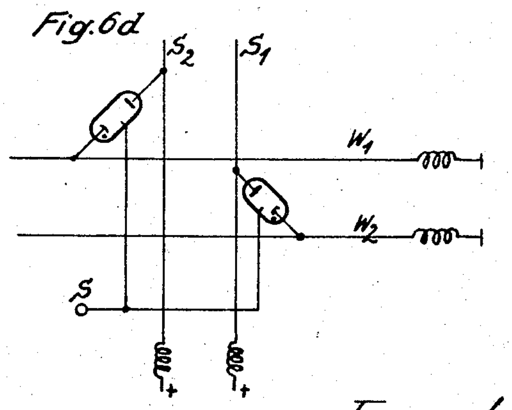

In place of the contacts such as $r_1$ and $r'_1$ of Fig. 6*a*, tubes may be provided at each crossing or switching point, e. g., tubes such as indicated in Fig. 6*c* or gates such as shown in Fig. 6*d*, which are operated by control potentials at the points S for respectively closing and opening the associated circuits. The connection extends over each contact only in one direction and no particular precaution need be taken in the use of the tubes for obtaining passage of current in both directions.

The invention is not inherently limited to telephone systems but may be used in other types of signalling systems as well. Changes may be made within the scope and spirit of the appended claims.

I claim:

1. In a telephone system having a plurality of individual subscriber stations subdivided into a plurality of groups, each group comprising a plurality of subscriber stations, a circuit arrangement for transmitting substantially simultaneously a plurality of messages carried by message-modulated pulses in accordance with a plurality of calls existing simultaneously between intercommunicating subscriber stations, said circuit arrangement comprising means for producing pulses which are respectively assigned to individual subscriber stations in each group of stations, means for periodically transmitting the respective pulses in the identical rhythm but in different time sequence, normally closed gate means cooperatively associated with subscriber stations in each group, a connecting device which is common to each group of stations, circuit means for connecting said gate means with said common group connecting device, circuit means for feeding to said gate means the pulses which are respectively assigned to the subscriber stations in the respective groups, said gate means being periodically opened by the pulses fed thereto whereby the individual stations in the corresponding groups are at different successively occurring instances operatively interconnected with said common connecting device, the spacing between said instances being a multiple of the spacing between the individual pulses, said pulses being thereby extended to the intercommunicating subscriber stations to which they are respectively assigned, for modulation thereof by portions of messages to be respectively conveyed thereby and which originate at the corresponding intercommunicating subscriber stations, a common transmission channel for all said groups, and a control circuit comprising an electron tube device which is cooperatively respectively associated with the connecting device which is common to each group, said control circuit being operatively responsive to said message-modulated pulses for interconnecting said connecting device with said common transmission channel and for simultaneously expanding said pulses.

2. The system defined in claim 1, wherein said control circuit comprises means including capacitors, inductances and rectifying means electrically coupled together so that said pulses are amplified.

3. The system defined in claim 1, wherein said control circuit comprises means including capacitors, inductances and rectifying means electrically coupled together for successively storing the received message modulated pulses and successively releasing such pulses, the duration of storing of said pulses being determined by the duration of the corresponding received pulses, the duration of each released pulse exceeding that of the corresponding received pulse.

4. The system defined in claim 1, comprising means in said control circuit for successively storing the received message modulated pulses and successively releasing such pulses, the duration of storing of said pulses being determined by the duration of the corresponding received pulses, the duration of each released pulse exceeding that of the corresponding received pulse, valve means in the discharge circuit of said storing means, and circuit means controlled by the pulse of greater duration for blocking said valve means.

5. The system defined in claim 4, comprising means effective during the blocking interval for connecting said common connecting device over said control circuit with said common transmission channel, means forming an inlet gate associated with the line to which said pulse is assigned, means for periodically opening said gate in step with said pulse, circuit means for transmitting said received message modulated pulse over said common connecting device and said inlet gate, and means for demodulating said pulse and directing the remaining message portion carried thereby to said line.

6. The system defined in claim 4, comprising means effective during the blocking interval for connecting said common connecting device over said control circuit with said common transmission channel, means forming an inlet gate associated with the line to which said pulse is assigned, means for periodically opening said gate in step with said pulse, circuit means for amplifying and for transmitting said received message modulated pulse over said common connecting device and said inlet gate, means for demodulating said pulse, and means for amplifying the remaining message portion carried thereby and directing such portion to the corresponding line.

7. The system defined in claim 1, comprising a plurality of connecting devices for extending a calling line to said common transmission channel, and means in said devices for successively shortening said message-modulated pulses.

8. The system defined in claim 1, comprising a plurality of connecting devices for extending a calling line to said common transmission channel, and means in said devices for successively modifying said message-modulated pulses.

References Cited in the file of this patent

UNITED STATES PATENTS

| | | |
|---|---|---|
| 2,324,394 | Holden | July 13, 1943 |
| 2,512,676 | Ransom | June 27, 1950 |
| 2,541,932 | Melhose | Feb. 13, 1951 |